United States Patent
Rogers et al.

(10) Patent No.: US 10,512,146 B2
(45) Date of Patent: Dec. 17, 2019

(54) X-RAY TUBE CASING

(71) Applicant: General Electric Company, Schenectady, NY (US)

(72) Inventors: Carey Shawn Rogers, Milwaukee, WI (US); Andrew J. Desrosiers, Milwaukee, WI (US); Matthew Karesh, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 271 days.

(21) Appl. No.: 15/630,409

(22) Filed: Jun. 22, 2017

(65) Prior Publication Data

US 2018/0376574 A1 Dec. 27, 2018

(51) Int. Cl.
| | | |
|---|---|---|
| *H01J 35/10* | (2006.01) | |
| *H05G 1/04* | (2006.01) | |
| *H01J 35/16* | (2006.01) | |
| *H05G 1/02* | (2006.01) | |
| *H01J 35/06* | (2006.01) | |

(Continued)

(52) U.S. Cl.
CPC ............... *H05G 1/04* (2013.01); *H01J 5/02* (2013.01); *H01J 35/065* (2013.01); *H01J 35/16* (2013.01); *H01J 35/24* (2013.01); *H05G 1/02* (2013.01); *H05G 1/025* (2013.01)

(58) Field of Classification Search
CPC .. H05G 1/04; H05G 1/025; H05G 1/02; H05J 5/02; H01J 35/065; H01J 35/16; H01J 35/24; H01J 5/02
See application file for complete search history.

(56) References Cited

U.S. PATENT DOCUMENTS

| 7,280,638 | B1 | 10/2007 | Weaver et al. |
| 2004/0202282 | A1 | 10/2004 | Miller |

(Continued)

FOREIGN PATENT DOCUMENTS

| JP | S58-30054 A | 2/1983 |
| JP | 2001223097 | 8/2001 |
| JP | 2001223097 A | 8/2001 |

OTHER PUBLICATIONS

Partial Search Report and Opinion issued in connection with corresponding EP Application No. 18178600.5 dated Nov. 27, 2018.

(Continued)

*Primary Examiner* — Kiho Kim
(74) *Attorney, Agent, or Firm* — Boyle Fredrickson, S.C.

(57) ABSTRACT

An x-ray tube casing is provided which includes a central frame having internal passages to supply a cooling fluid directly to the casing without the need for an external dedicated heat exchanger. The cooling fluid flowing through the passages in the casing can thermally contact the dielectric coolant within the casing to cool the tube coolant during operation of the x-ray tube. The casing is formed in an additive manufacturing process to allow for tight tolerances with regard to the structure for the casing and the internal passages to reduce the size and weight of the casing. The casing can additionally be formed from a metal matrix including a metal with high x-ray attenuation and a filler metal. The metal matrix eliminates the need for a separate x-ray attenuation layer within the casing, further reducing the size, number of parts and assembly complexity of the casing.

20 Claims, 8 Drawing Sheets

(51) Int. Cl.
*H01J 35/24* (2006.01)
*H01J 5/02* (2006.01)

(56) References Cited

U.S. PATENT DOCUMENTS

| | | | | |
|---|---|---|---|---|
| 2004/0234041 A1* | 11/2004 | Artig | ............... | H01J 35/16 378/203 |
| 2006/0146985 A1* | 7/2006 | Deutscher | ............ | H01J 35/305 378/121 |
| 2008/0043919 A1* | 2/2008 | Chapin | ............... | H05G 1/04 378/119 |
| 2015/0139406 A1 | 5/2015 | Hansen et al. | | |
| 2017/0018393 A1 | 1/2017 | Kuth | | |

OTHER PUBLICATIONS

EP application 18178600.5; European extended Search Report dated Apr. 15, 2019; 14 pages.

* cited by examiner

X-RAY TUBE CASING

BACKGROUND OF THE INVENTION

The invention relates generally to x-ray tubes, and more particularly to a casing for enclosing the various components of the x-ray tube insert.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then sends data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

The X-ray tube includes an x-ray tube insert and an x-ray tube casing. The x-ray tube insert is the functional device that generates x-rays, while the x-ray tube casing is a housing that surrounds, protects and supports the insert. The x-ray tube casing performs the following functions:

- physically supporting the x-ray tube insert inside the x-ray tube casing so that an x-ray transmissive window on the x-ray tube insert is held in a position registered to the x-ray transmissive window in the x-ray tube casing, enabling x-rays produced within the x-ray tube insert to exit the x-ray tube assembly and illuminate the object of interest;
- shielding of x-rays emanating from the x-ray tube insert except for a defined portion that pass through x-ray transmissive window(s) toward the object of interest;
- supporting the motor stator relative to the motor rotor for a rotating anode x-ray tube;
- providing for high-voltage electrical connections between the x-ray tube insert and the high voltage generator, which are typically made via high voltage plug and socket or via a high voltage connector being removably secured to a high voltage insulator with a silicone gasket in-between;
- hermetically enclosing and directing a coolant within the x-ray tube casing around the x-ray tube insert—the vacuum vessel of the x-ray tube insert gets very hot when operated and that heat is removed by circulating a dielectric coolant over the x-ray tube insert vacuum vessel that is subsequently pumped to an external heat exchanger where the heat is rejected to the room air or to another liquid coolant before being returned to the x-ray tube casing; and
- operably connecting the x-ray tube insert to the imaging system gantry or positioner.

Looking at FIGS. 1-2, a portion of a typical medical x-ray tube casing 10' includes an aluminum housing 12' with a lead (Pb) shielding sheet 14' pressed into and against the interior surface or wall 16' of the aluminum housing 12', except over a transmissive window 15' secured over an opening in the housing 12'. The lead sheet 14' is typically bonded with an epoxy to the interior wall 16' of the aluminum housing 12'. The interior surface 18' of the lead sheet 14' is also painted to prevent oxidation and contamination of the dielectric coolant 26' that comes into contact with the interior surface 18' of the lead sheet 14'.

The aluminum housing 12' is typically fabricated by a casting technique, machined from bulk material, or fabricated from separate formed pieces that are joined together by welding and/or brazing processes. For manufacturing and economic reasons a constant thickness lead sheet 14' is pressed into the housing 12'. The lead sheet 14' lining process is laborious as it is important that there are no gaps between the housing 12' and the sheet 14' where unwanted radiation can escape from the casing 10'. This is particularly challenging at joint transitions between parts of the housing 12'. Consequently, uniform thickness shielding is present across the entire interior surface 16' of the housing 12', resulting in more lead 14' being employed than is required, particularly in areas of the housing 12' where stray x-ray emission is low. This is negative for a number of reasons:

- increased material and manufacturing costs for the assembly of the casing 10' using the excess lead sheet 14';
- the handling and installation of the x-ray tube casing 10' is difficult due to the increased weight of the casing 10', normally requiring more than one person or mechanical assists; and
- the structure of the gantry or positioner of the medical imaging system must be more substantial to handle the increased weight of the casing 10' which increases the cost of the system.

Looking now at FIGS. 3-4, the x-ray tube casing 10', such as that commonly used on interventional imaging systems is illustrated including two high voltage receptacles 22' attached to opposed end caps 21' connected to a center frame 23' of the aluminum casing 10' that are each operably connected to a high voltage generator (not shown). The casing 10' additionally includes a heat transfer circuit 25' utilizing a cooling system disposed externally of the tube 10' and including a water chiller 27' and pump 29' circulating cooled water through a dedicated tube coolant to water heat exchanger 24' to thermally contact and cool the dielectric tube coolant 26' contained within the casing 10' and pumped through the opposing side of the heat exchanger 24. The tube coolant 26' passes through a filter 28' that preserves the electrically insulating properties of the dielectric coolant 26'. As schematically shown in FIG. 4, the coolant 26' is present within the casing 10' to support the x-ray tube insert 30' within the casing 10' as an intermediate layer to provide heat removal from the insert 30'.

For a high power interventional x-ray tube insert 30', for the x-ray casing 10' a typical wall thickness of aluminum housing 12' is several mm and the lead sheet 14' is approximately two (2) to four (4) mm thick. The dimensional tolerance on the thickness of the lead sheet 14' is usually relatively large owing to the lower precision manufacturing processes used to place the lead sheet 14' into the housing 12' for the casing 10' and the need to maintain a minimum thickness for sufficient radiation shielding. Due to the wide tolerance of the lead sheet 14', a typical coolant gap in a conventional tube casing is held from about 2.5 to 3.5 mm.

While sufficient to cool the tube coolant 26' from within the casing 10', the dedicated tube coolant-water heat exchanger 24' and associated cooling circuit 25' creates added cost and weight and size to the x-ray tube casing 10', in addition to that created by the lead sheet 14'. Further, the size of the tube casing 10', including the heat exchanger 24'/cooling circuit 25' mounted to the exterior of the casing 10', limits the degree of oblique imaging angles around the patient and can compromise the quality of exam performed.

As a result, it is desirable to develop a structure, method of manufacture and method for use of an improved x-ray tube casing that is designed to reduce the weight and size of the casing while improving the cooling capacity and x-ray shielding capabilities of the casing when in use.

BRIEF DESCRIPTION OF THE INVENTION

In the invention, an x-ray tube casing includes a housing that provides radiation shielding, x-ray insert cooling and mechanical support without the need for an external cooling circuit. The casing can be initially formed to include walls having integral internal passages therein to supply a cooling fluid directly to and through the casing body without the need for an external cooling circuit and/or dedicated heat exchanger.

According to another aspect of an exemplary embodiment of the invention, the housing for the x-ray tube casing is manufactured in an additive manufacturing process. This integral nature of the casing eliminates fluid leaks that can occur at joints between component parts of prior art casings where separate shielding material sheets or components do not completely overlap. The additive manufacturing process also enables the x-ray tube casing to be formed with intricate patterns for the passages within the casing that cannot be readily constructed utilizing other manufacturing methods and processes.

According to another aspect of an exemplary embodiment of the invention, the housing for the x-ray tube casing is manufactured in an additive manufacturing process with an x-ray shielding material within the structural wall of the casing and not as a distinct separate layer as in medical x-ray tubes today. The housing is formed from a metal matrix including a first metal with high x-ray attenuation characteristics, that negate the need for a separate lead shielding layer within the housing, and a second metal. The second metal can be selected to confer additional benefits to the housing such as high thermal conductivity, ductility, and/or strength, among others. The shielding material incorporated within the material forming the casing is continuous throughout the casing structure. This integral nature of the x-ray shielding material within the casing eliminates x-ray leaks that can occur at joints between component parts of prior art casings where separate shielding material sheets or components do not completely overlap. The wall thickness of the casing can be varied during manufacture in accordance with the degree of shielding needed at any particular location. This optimization provides the necessary amount of shielding at different locations in the casing while minimizing the overall mass of the casing.

According to another aspect of an exemplary embodiment of the invention, the construction of the casing with cooling channels embedded in the casing provides the casing with the capability to direct chilled water coolant through the casing, and optionally to direct dielectric coolant through passages in the casing as well, thereby providing more effective heat exchange as a result of the large surface area of the casing that is in direct contact with the dielectric coolant flowing between the insert and the casing.

According to still a further aspect of an exemplary embodiment of the invention, ability to manufacture the casing with close tolerances enable the formation of a casing that minimizes the gap between the casing and the x-ray tube insert. This enables a reduction in the size of the oil gap between the casing and the x-ray tube insert, which consequently enhances the contact of the oil with the casing for heat transfer purposes and also provides increased dimensional tolerance to the insert when placed within the casing.

In another exemplary embodiment of the invention, the invention is an x-ray tube casing for an x-ray tube insert including a central frame adapted to receive the x-ray tube insert therein, the central frame including a side wall and at least one passage formed internally within the side wall, the passage having and inlet end and an outlet end.

In still another exemplary embodiment of the invention, an x-ray tube includes an x-ray tube insert including a frame defining an enclosure, a cathode assembly disposed in the enclosure an anode assembly disposed in the enclosure spaced from the cathode assembly, and a first x-ray transmissive window disposed on the frame and an x-ray tube casing including a central frame within which the x-ray tube insert is placed, the central frame including a side wall, a second x-ray transmissive window on the side wall in alignment with the first x-ray transmissive window on the frame and at least one internal passage formed within the side wall.

In an exemplary embodiment of a method of the invention, a method for cooling dielectric coolant within an x-ray tube includes the steps of providing an x-ray tube casing including a central frame having at least one internal passage formed within the central frame, placing an x-ray tube insert within an interior space defined by the central frame, placing an amount of dielectric coolant in the interior space between the x-ray tube insert and the central frame and directing a flow of cooling fluid through the at least one internal passage.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Exemplary embodiments of the invention relate to an X-ray tube system including an increased emitter area to accommodate larger emission currents in conjunction with microsecond X-ray intensity switching in the X-ray tube. An exemplary X-ray tube and a computed tomography system employing the exemplary X-ray tube are presented.

Figure 1:
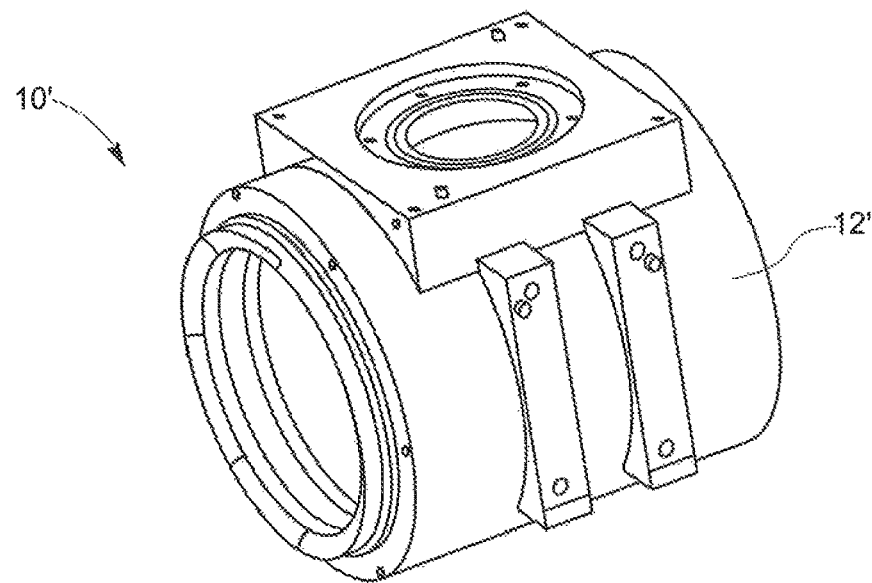
FIG. 1 is an isometric view of a prior art x-ray tube casing.
Figure 2:
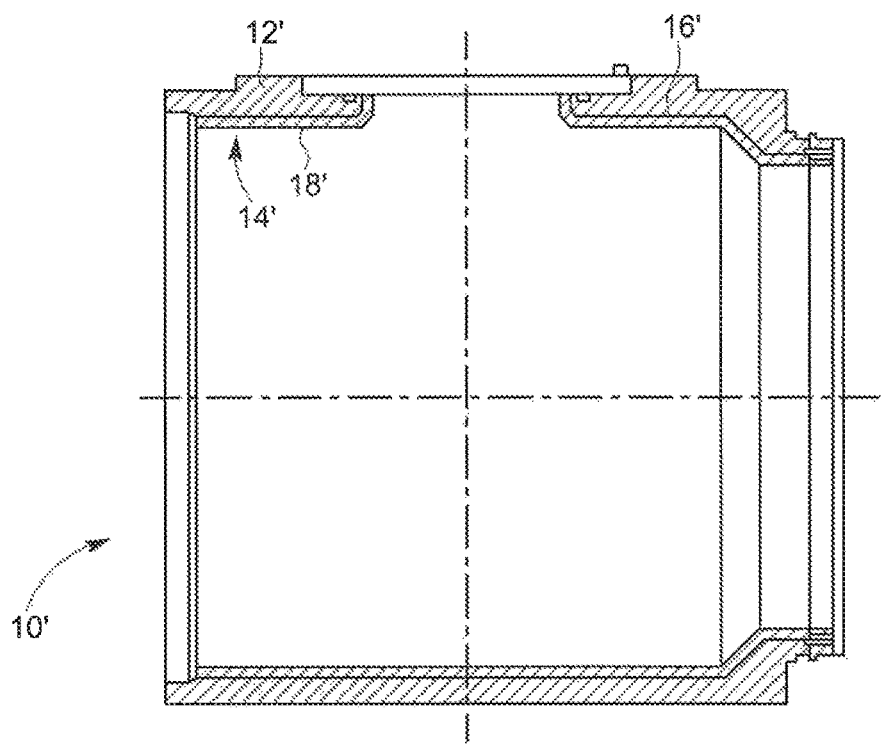
FIG. 2 is a cross-sectional view of the prior art casing along line 2-2 of FIG. 1.
Figure 3:
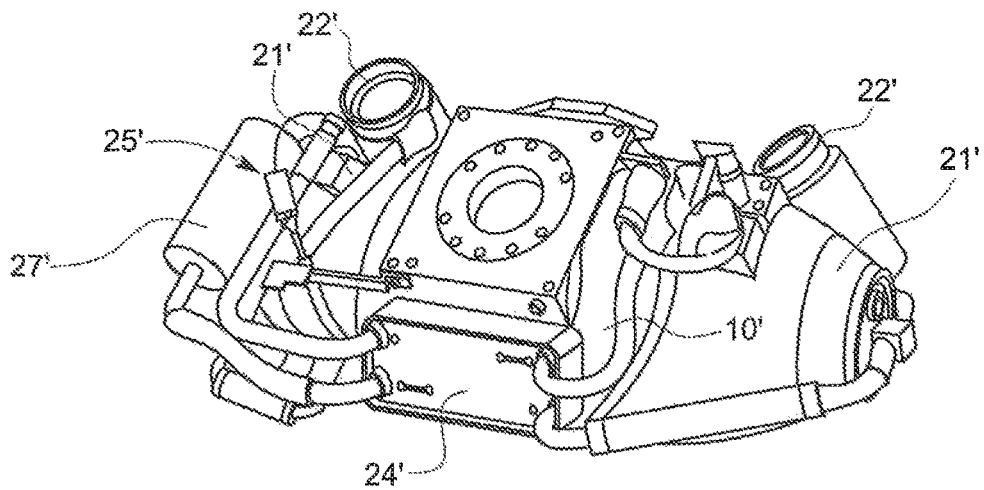
FIG. 3 is an isometric view of a prior art assembled x-ray system with the x-ray casing of FIG. 1 secured between end caps.
Figure 4:
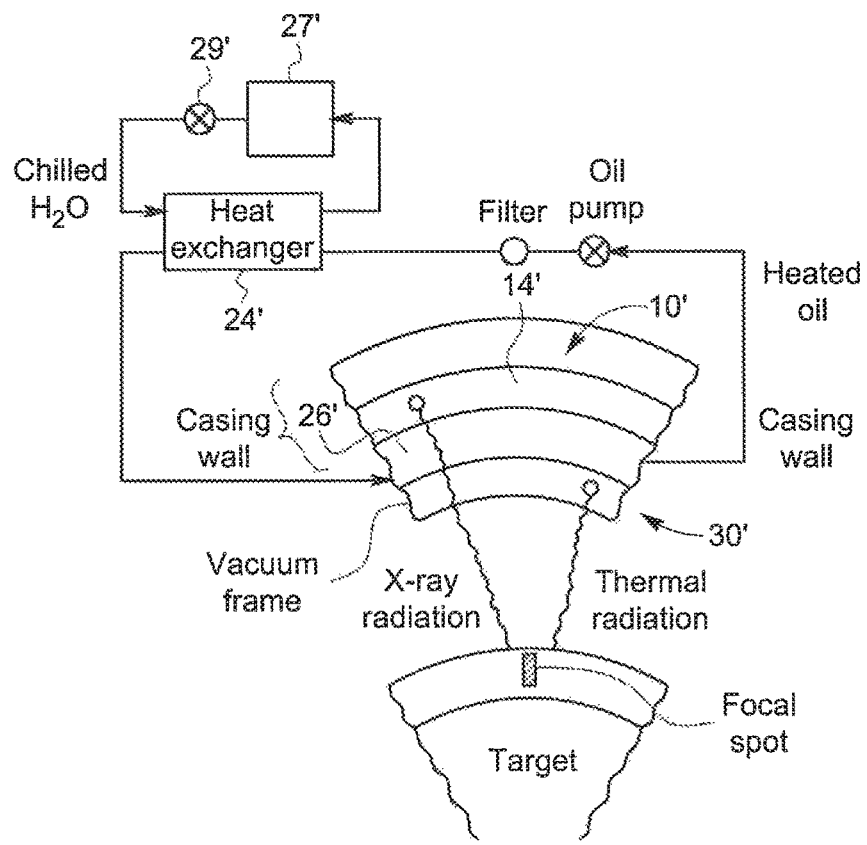
FIG. 4 is a schematic view of the prior art x-ray system of FIG. 3.
Figure 5:
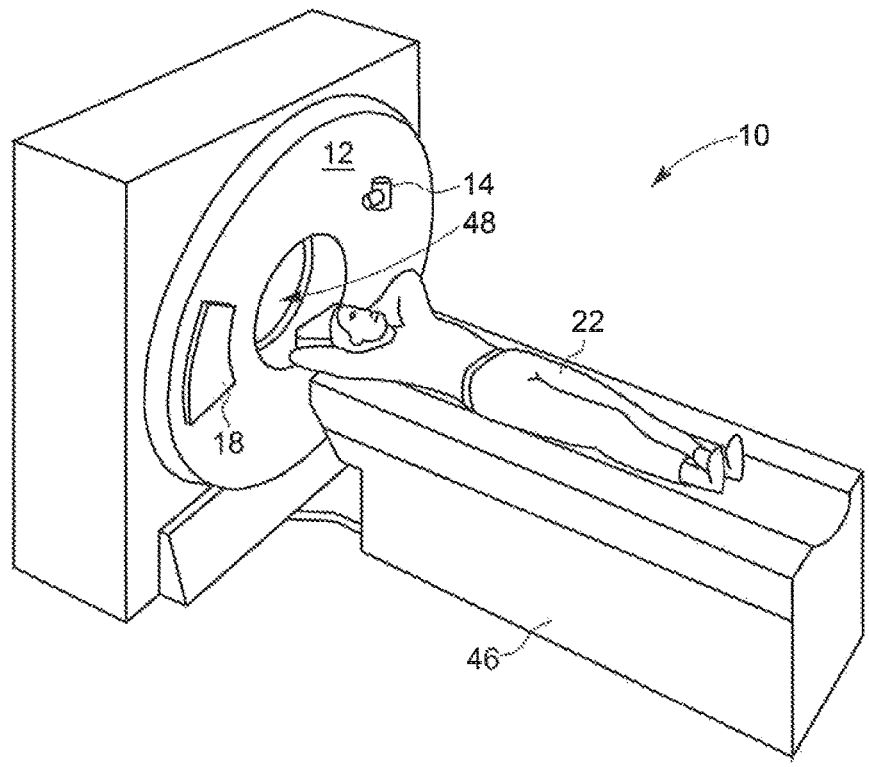
FIG. 5 is a schematic representation of a CT imaging system according to an exemplary embodiment of the invention.
Figure 6:
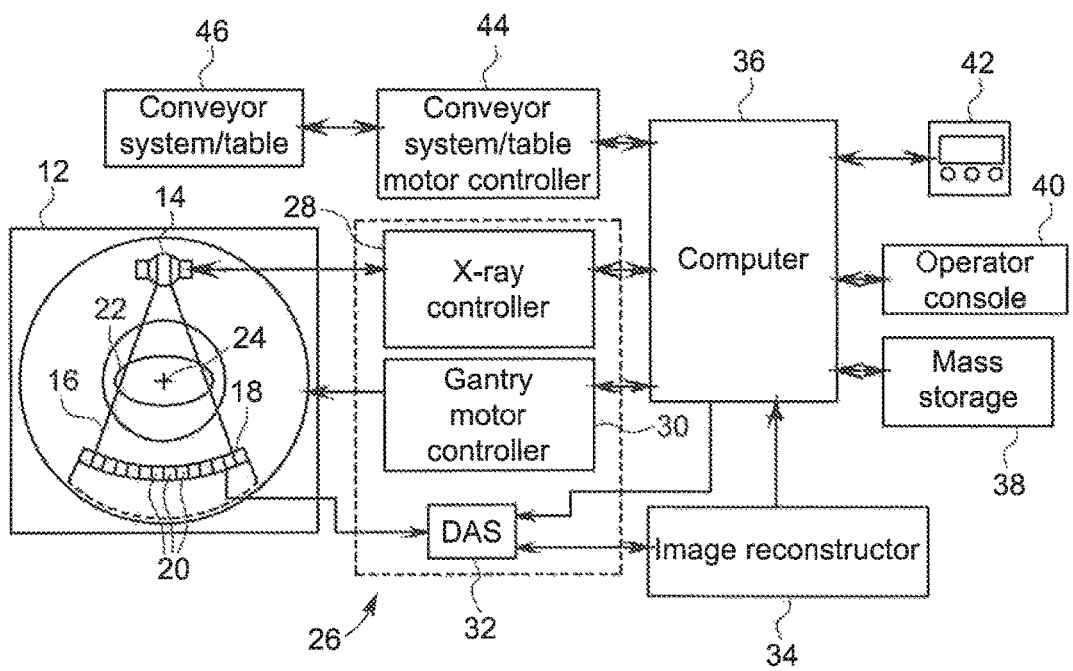
FIG. 6 is a block schematic diagram of the CT imaging system illustrated in FIG. 5.

Referring now to FIGS. 5 and 6, a computed tomography (CT) imaging system 10 is illustrated in accordance with one exemplary embodiment of the invention that includes a gantry 12 and an X-ray source 14, which typically is an X-ray tube insert 14 that projects a beam of X-rays 16 towards a detector array 18 positioned opposite the X-ray tube on the gantry 12. In one embodiment, the gantry 12 may have multiple X-ray sources (along the patient theta or patient Z axis) that project beams of X-rays. The detector array 18 is formed by a plurality of detectors 20 which together sense the projected X-rays that pass through an object to be imaged, such as a patient 22. During a scan to acquire X-ray projection data, the gantry 12 and the components mounted thereon rotate about a center of rotation 24. While the CT imaging system 10 described with reference to the medical patient 22, it should be appreciated that the CT imaging system 10 may have applications outside the medical realm. For example, the CT imaging system 10 may be utilized for ascertaining the contents of closed articles, such as luggage, packages, etc., and in search of contraband such as explosives and/or biohazardous materials.

Rotation of the gantry 12 and the operation of the X-ray tube insert/source 14 are governed by a control mechanism 26 of the CT system 10. The control mechanism 26 includes an X-ray controller 28 that provides power and timing signals to the X-ray tube insert/source 14 and a gantry motor controller 30 that controls the rotational speed and position of the gantry 12. A data acquisition system (DAS) 32 in the control mechanism 26 samples analog data from the detectors 20 and converts the data to digital signals for subsequent processing. An image reconstructor 34 receives sampled and digitized X-ray data from the DAS 32 and performs high-speed reconstruction. The reconstructed image is applied as an input to a computer 36, which stores the image in a mass storage device 38.

Moreover, the computer 36 also receives commands and scanning parameters from an operator via operator console 40 that may have an input device such as a keyboard (not shown in FIGS. 5-6). An associated display 42 allows the operator to observe the reconstructed image and other data from the computer 36. Commands and parameters supplied by the operator are used by the computer 36 to provide control and signal information to the DAS 32, the X-ray controller 28 and the gantry motor controller 30. In addition, the computer 36 operates a table motor controller 44, which controls a motorized table 46 to position the patient 22 and the gantry 12. Particularly, the table 46 moves portions of patient 22 through a gantry opening 48. It may be noted that in certain embodiments, the computer 36 may operate a conveyor system controller 44, which controls a conveyor system 46 to position an object, such as, baggage or luggage and the gantry 12. More particularly, the conveyor system 46 moves the object through the gantry opening 48.

Figure 7:
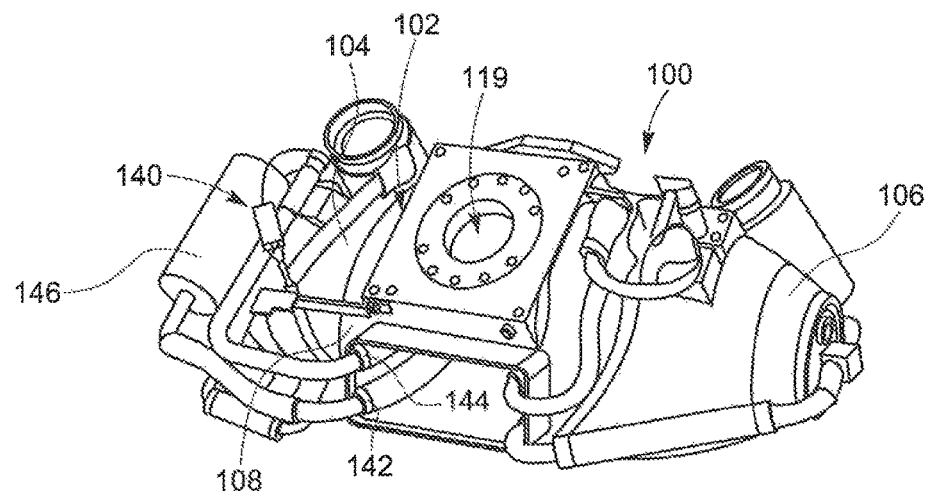
FIG. 7 is an isometric view of an x-ray tube casing in accordance with an exemplary embodiment of the invention.
Figure 8:
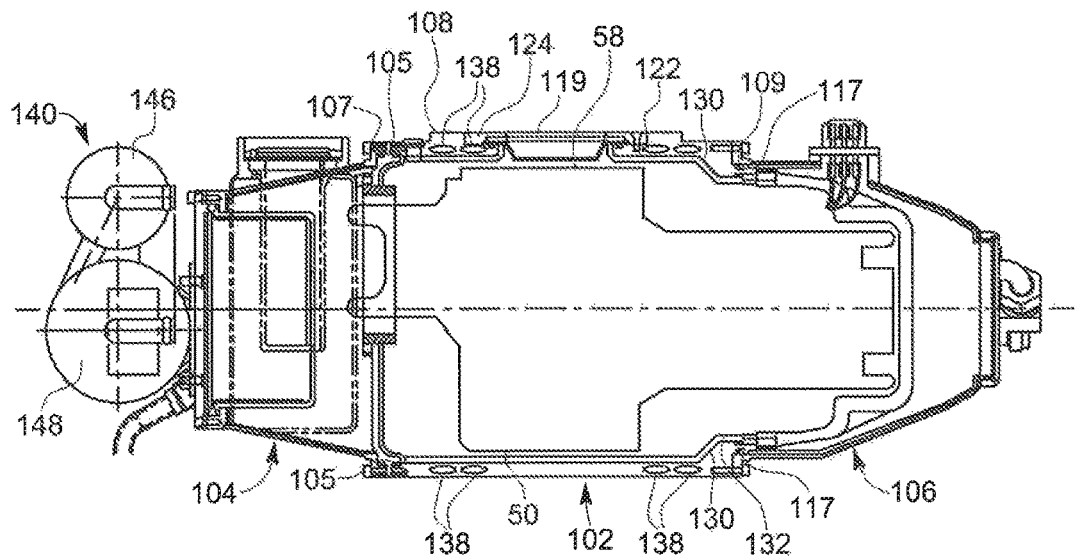
FIG. 8 is a cross-sectional view of an x-ray tube insert and an x-ray tube casing in accordance with an exemplary embodiment of the invention.

Looking now at FIGS. 7 and 8, in the illustrated exemplary embodiment the x-ray tube insert 14 is disposed within an x-ray tube casing 100. X-ray tube insert/source 14 includes a frame 50 that encloses a vacuum region 54, and an anode (not shown) and a cathode assembly (not shown) are positioned therein. Anode includes a target (not shown). Terms "anode" and "target" are to be distinguished from one another, where target typically includes a location, such as a focal spot, wherein electrons impact a refractory metal with high energy in order to generate x-rays, and the term anode typically refers to an aspect of an electrical circuit which may cause acceleration of electrons theretoward. Target is attached to a shaft (not shown) supported by a bearing assembly (not shown) for rotation of the target within the frame 50. The cathode assembly is connected to a high voltage source by electrical leads (not shown) connected to the cathode assembly. X-ray tube 12 includes a window 58 typically made of a low atomic number metal, such as beryllium, to allow passage of x-rays therethrough with minimum attenuation.

In operation, target is spun via a stator (not shown) external to rotor (not shown) on the bearing assembly. An electric current is applied to cathode assembly via feedthrus (not shown) to heat emitter (not shown) on the cathode assembly and emit electrons therefrom. A high-voltage electric potential is applied between anode and cathode, and the difference therebetween accelerates the emitted electrons from cathode to anode. Electrons impinge target and x-rays emit therefrom and pass out of the frame 50 through window 58.

The casing 100 includes a center frame 102, a first high voltage (HV) connector/cathode end cap 104 secured to the casing 100 adjacent the cathode assembly and a second HV connector/anode end cap 106 secured to the center frame 102 opposite the HV connector 104. The center frame 102 is formed of a housing 108 that is open at each end 107, 109 (FIG. 9) and within which the cathode assembly and anode of the x-ray tube insert 14 are partially disposed. The cathode end cap 104 is connected to or disposed around one open end 107 of the housing 108 which encloses the cathode assembly of the x-ray source 14 that extend outwardly from the housing 108. The anode end cap 106 is connected to or disposed around one open end 109 of the housing 108 which encloses the shaft and bearing assembly of the x-ray tube insert 14 that extend outwardly from the housing 108.

Figure 9:
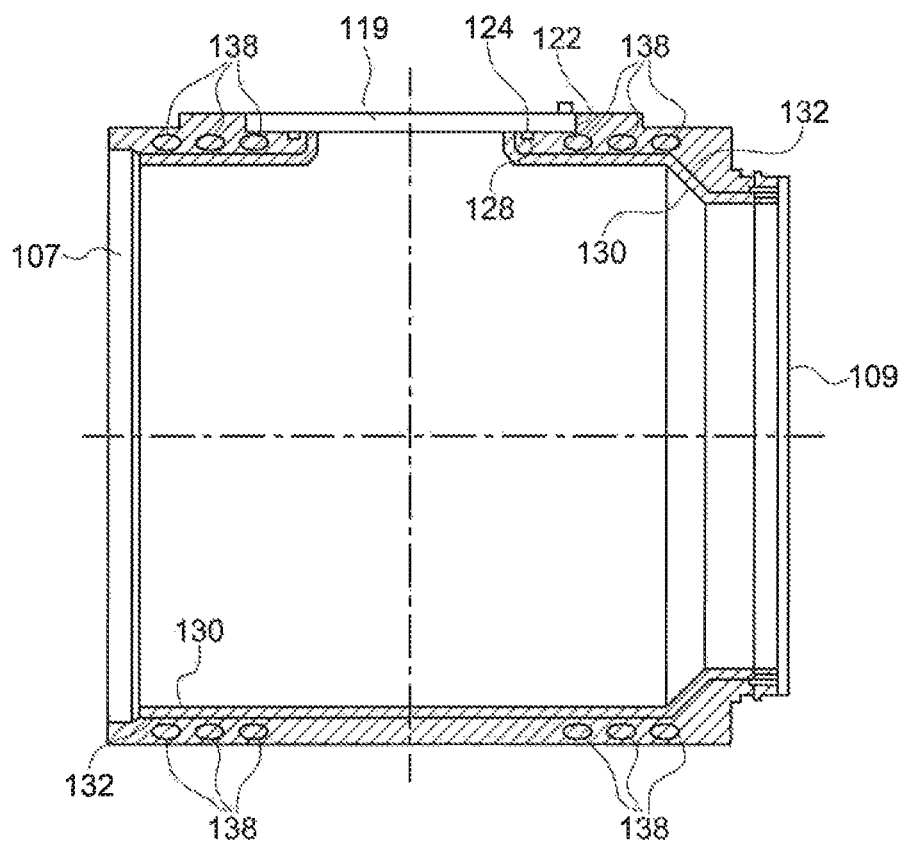
FIG. 9 is a partially broken away, cross-sectional view of a central frame of the x-ray tube casing in accordance with an exemplary embodiment of the invention.

Referring now to the exemplary embodiments illustrated in FIGS. 7-9, HV connector 104 is secured to the open end 107 to compress a sealing member, such as an O-ring seal 105, between the connector 104 and the open end 107 of the housing 108 to form a fluid-tight seal therebetween. The open end 109 of the housing 108 is enclosed by the anode end cap 106 and engaged with an O-ring seal 117 between the anode end cap 106 and the open end 109. With the hosing 108 sealed at both ends by the end caps 104, 106 and the O-rings 105,117, it is possible to fill the housing 108 with an amount of dielectric coolant or oil (not shown) in order to provide cooling to the operation of the anode, cathode assembly, shaft and bearing assembly.

Figure 10:
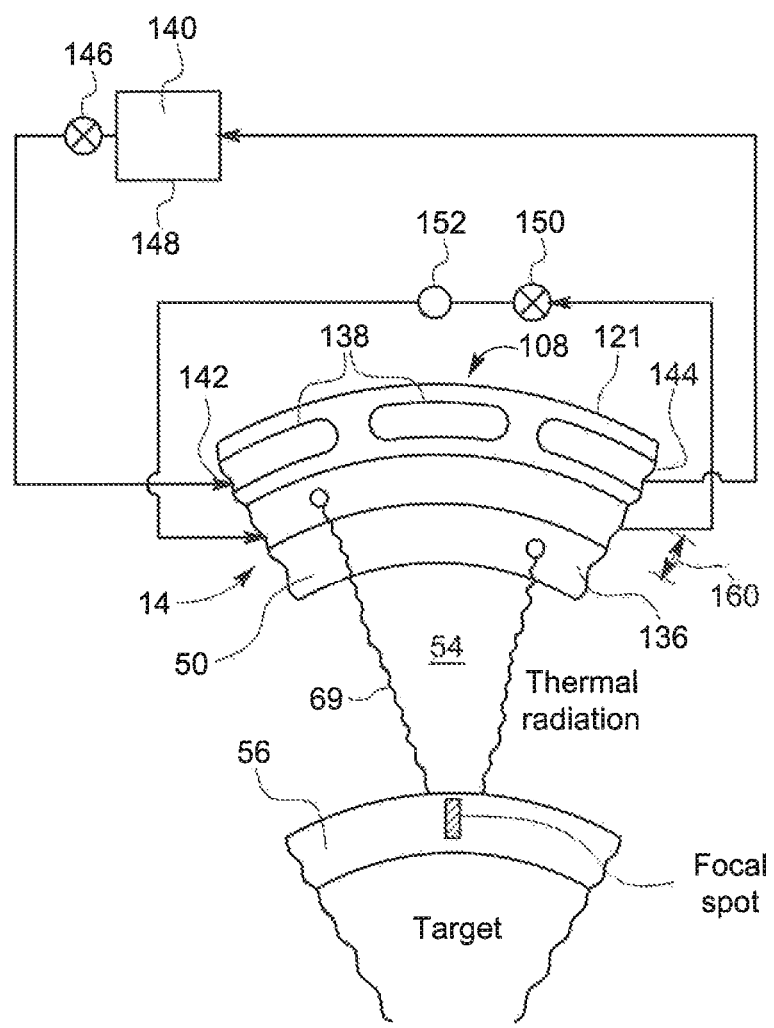
FIG. 10 is a schematic view of an x-ray tube insert and an x-ray tube casing in accordance with an exemplary embodiment of the invention.
Figure 11:
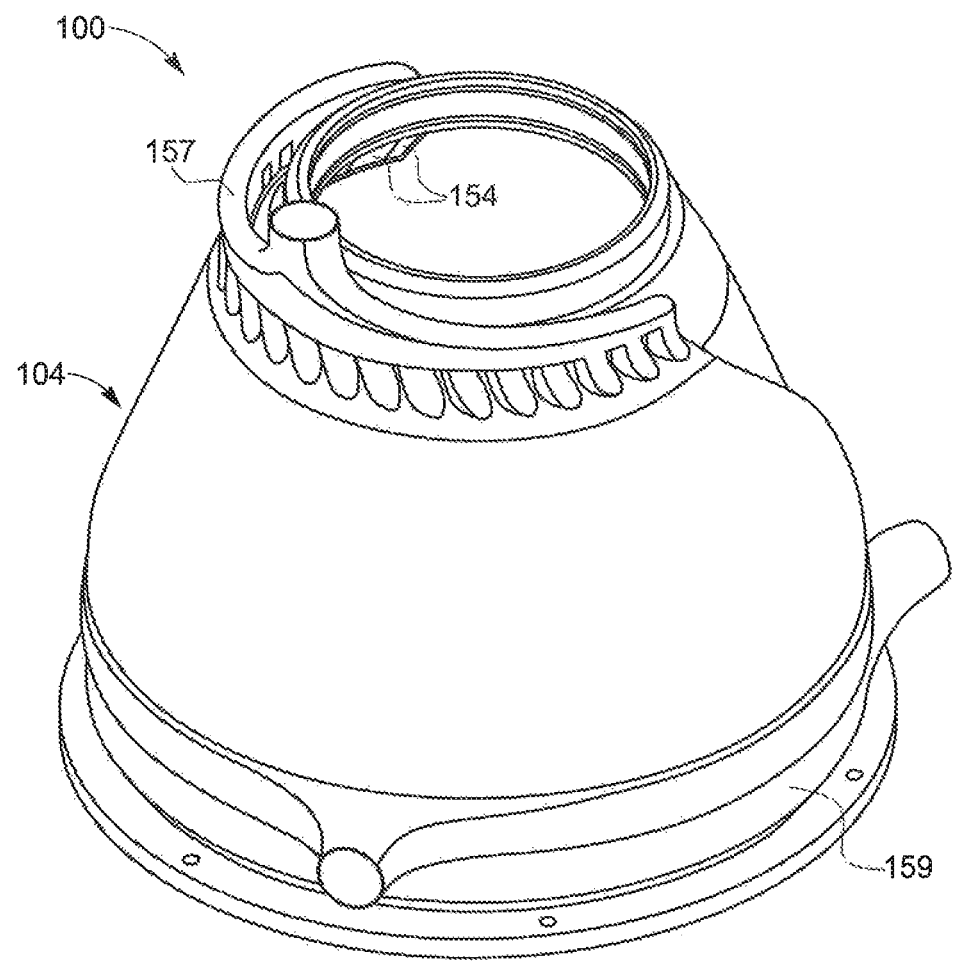
FIG. 11 is an isometric view of an x-ray casing in accordance with another exemplary embodiment of the invention.
Figure 12:
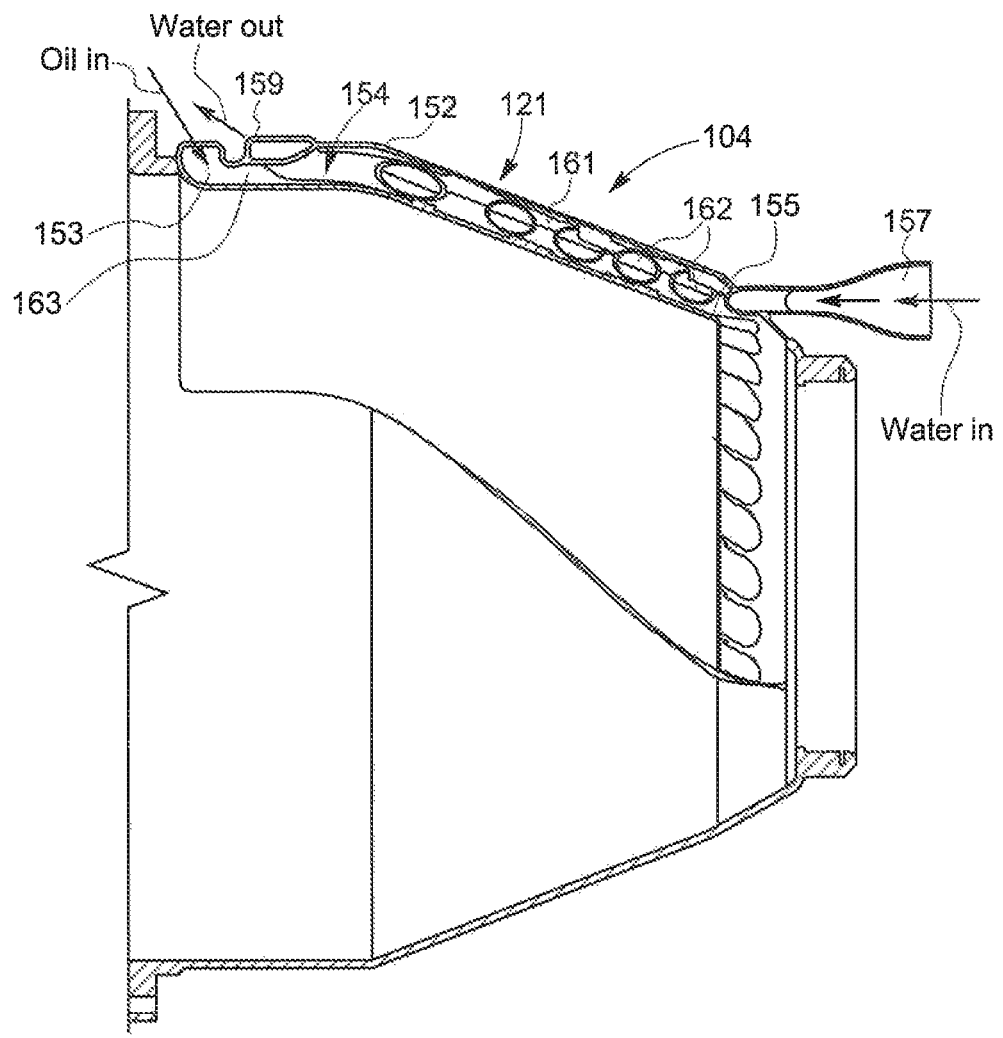
FIG. 12 is a cross-sectional view of an x-ray casing in accordance with another exemplary embodiment of the invention.

Referring now to the exemplary embodiments illustrated in FIGS. 10-12, the housing 108 includes a window 119 formed in a side wall 121 of the housing 108 that extends between the open ends 107, 109. The window 119 is formed of a suitable x-ray transmissive material, and is secured to the housing 108 over an opening 122 formed in the side wall 121. The window 119 is secured to the side wall 121 in a fluid-tight manner with a sealing member, such as an O-ring 126, disposed in a notch 128 formed around the periphery of the opening 122 to sealingly engage the housing 108 and the window 119. When the x-ray tube insert 14 is positioned within the casing 100, the window 58 on the frame 50 is positioned in alignment with the windrow 119 of the casing 100 to enable transmission of x-rays from the target through the frame 50 and casing 100. Further, the housing 108 includes one or more stabilizing structures 127 (FIG. 8) formed on the housing 108 that can be interconnected with the frame 50 of the x-ray tube insert 14 in order to secure the frame 50 of the x-ray tube insert 14 in the proper position within the housing 108, such as with the window 58 in the frame 50 in alignment with the window 119 in the housing 108.

To prevent the transmission of x-rays through any portion of the housing 108 other than through the window 119, in one exemplary embodiment the housing 108 includes an x-ray attenuation layer 130 disposed over the entire interior surface 132 of the housing 108 between the open ends 107, 109, with the exception of the opening 121 over which the window 119 is positioned. The x-ray attenuation layer 130 is formed of a suitable material capable of absorption of stray x-ray's generated by the x-ray tube insert 14 that are not directed through the window 119. In one exemplary embodiment for the layer 130, the layer 130 is formed of lead and is positioned against and adhered to the interior of the housing 108 and optionally the end caps 104,106 using a suitable adhesive (not shown).

As schematically illustrated in the exemplary embodiment of FIG. 10, when assembled with the end caps 104,106, the housing 108 defines an interior space 134 within which the portion of the x-ray tube insert 14 including the cathode assembly 60 and anode 56/target 57 is located. The sealing members 103,117 on the housing 108 effectively form a fluid-tight enclosure around the interior space 134 in order to retain an amount of a cooling dielectric oil or coolant 136 in the interior space 134 between the x-ray tube insert/source 14 and the housing 108. The oil/coolant 136 functions to cool the internal components of the x-ray tube insert 14 by thermally contacting the frame 50 of the x-ray tube/source 14 and drawing the heat generated by the operation of the x-ray tube insert 14 out of the x-ray tube insert 14 via contact with the frame 50.

In order to remove the heat from the dielectric oil/coolant 136, the housing 108, and optionally the end caps 104,106 is formed with passages 138 disposed completely within the side wall 121 of the housing 108. The passages 138 can be formed as a continuous passage 138 throughout the side wall 121 of the housing 108, or can be formed as individual passages 138 each extending through the side wall 121. The passages 138 are each connected to a source of a cooling fluid 140, such as water, a water/glycol mixture or any other suitable fluid having desirable heat exchange properties, that is directed into the passages 138 to flow from an inlet end 142 of each passage 138 to an outlet end 144. The heat transfer properties of water are significantly superior to dielectric oil, so the total heat transfer is determined by the heat transfer from the vacuum vessel wall to the oil. Each passage 138 is formed within the side wall 121 to retain a thickness of the side wall 121 between the interior space 134 of the housing 108 and the passages 138 that is sufficient to enable the cooling fluid 140 flowing through the passages 138 to thermally contact the oil 136 located within the interior space 134, but without enabling the oil 136 and fluid 140 to come into direct contact with one another. This provides effective heat exchange due to the large surface area of the side wall 121 that is in direct contact with the dielectric oil 136 flowing between the x-ray tube insert 14 and the side wall 121. The cooling fluid 140 can be introduced into the inlet end 142 of the passages 138 by a pump 146 connected to a chilled reservoir 148 of the cooling fluid 140 that operates to cool the heated cooling fluid 140 exiting the passages 138 in the housing 108. The operation of the pump 146 can be controlled to direct the cooling fluid 140 into the passages 138 at a rate commensurate with the operation of the x-ray tube 14 in order to provide the proper cooling to the dielectric oil 136.

The dielectric oil/coolant 136 can be allowed to come into thermal contact with the cooling fluid 140 in passages 138 solely by convection, where the heat absorbed by the oil/coolant 136 adjacent the frame 50 causes the heated oil/coolant 136 to move outwardly from the frame 50 where it is heated through the interior space 134 towards the housing 108. Upon reaching the housing 108, the heated oil/coolant 136 thermally contacts the cooling fluid 140 flowing through the passages 138 in order to cool the oil/coolant 136, which subsequently flows back towards the frame 50 to displace heated oil 1136 near the frame 50. This embodiment is applicable for lower average power x-ray tubes 14 employed on surgical C-arms and further reduces cost, size and weight due to elimination of the oil pump 150.

Alternatively, the oil 136 can be circulated into thermal contact with the cooling fluid 140 by a dielectric oil/coolant pump 150 that withdraws heated oil 136 from the interior space 134 and through an oil filter 151 prior to re-introduction of the oil 136 into the interior space 134 of the housing 108. In this manner the oil 136 is drawn into thermal contact with the cooling fluid 140 flowing through the passages 138 in order to cool the oil 136.

As the channels 138 are formed directly within the side wall 121 of the housing 108 of the casing 100, and optionally the endcaps 104, 106, manufacturing processes with tight tolerance controls are necessary to form the casing 100. In order to reduce costs, weight and to provide the intricately formed side wall 121 with the internal passages 138 as described, one or more of the casing 100/center frame 102/housing 108/end caps 104,106 may be manufactured or formed, separately or integrally with one another, at least in part or entirely, via one or more additive manufacturing techniques or processes, thus providing for greater accuracy and/or more intricate details within the casing 100/center frame 102/housing 108/end caps 104,106 than previously producible by conventional manufacturing processes. As used herein, the terms "additively manufactured" or "additive manufacturing techniques or processes" include but are not limited to various known 3D printing manufacturing methods such as Extrusion Deposition, Wire, Granular Materials Binding, Powder Bed and Inkjet Head 3D Printing, Lamination and Photo-polymerization.

In one embodiment, the additive manufacturing process of Direct Metal Laser Sintering DMLS is a preferred method of manufacturing the casing 100/center frame 102/housing 108/end caps 104,106 described herein. DMLS is a known manufacturing process that fabricates metal components using three-dimensional information, for example a three-dimensional computer model of the casing 100/center frame 102/housing 108/end caps 104,106. The three-dimensional information is converted into a plurality of slices where each slice defines a cross section of the component for a predetermined height of the slice. The casing 100/center frame 102/housing 108/end caps 104,106, such as the side wall 121 of the housing 108, is then "built-up" slice by slice, or layer by layer, until finished. Each layer of the casing 100/center frame 102/housing 108/end caps 104,106 is formed by fusing a metallic powder using a laser.

Although the methods of manufacturing the casing 100/center frame 102/housing 108/end caps 104,106 including the internal passages 138 have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Binderjet printing, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

With the precise manufacturing tolerances provided through the use of the additive manufacturing process for the construction of the casing 100, referring to FIG. 13 the side wall 121 of the housing 108, or other component of the casing 100, can be formed with an overall thickness of between 7 mm-9 mm, and in other embodiments between 7.5 mm-8.5 mm, with the passages 138 being formed with a width of between 1.0 mm-2.0 mm, and in other embodiments between 1.5 mm and 1.8 mm, within the side wall 12. This allows for a tighter control of the oil gap 160 between the frame 50 of the x-ray tube insert 14 and the side wall 121 of the casing 100 to significantly increase the heat transfer coefficient compared to the traditional casing, which is achieved by maintaining a smaller hydraulic diameter of the oil layer/gap 160.

In another exemplary embodiment, the casing 100, or a component part of the casing 100, such as the entire center frame 102, the housing 108, the rotor can 110, the end caps 104,106 or any combination thereof can be formed to include the passages 138 therein to enable cooling fluid 140 to pass through the side wall 121 of the casing 100 or component part thereof. This provides the casing 100 with additional cooling functionality, such as to accommodate for the heat generated by the operation of the shaft 61 and bearing assembly 63.

Referring now to FIGS. 11-12, in the illustrated exemplary embodiment the casing 100, or a component part of the casing 100, such as the entire center frame 102, the housing 108, the end caps 104,106 including the high voltage connector (not shown), or any combination thereof can be formed to internal countercurrent channels 152,154 extending through the side wall 121 of the component part of the casing 100. As illustrated, the channels 152 are connected between an inlet tube 153 and an outlet tube 155 to provide a first flow path 156 for the heated dielectric oil 136 and the channels 154 are connected between an inlet header 157 and an outlet header 159 to provide a second parallel, crosscurrent or countercurrent flow path 158 for the cooling fluid 140 that is directed into the channels 154. While any configuration for the channels 152,154 is contemplated as being within the scope of the invention, in FIG. 12 the channels 154 are formed as individual countercurrent conduits 161 extending between the inlet header 155 and the outlet header 157 that are surrounded by a hollow portion 163 of the side wall 121 that forms the channels 152 around the conduits 161. Thus, the heated dielectric oil 136 flows through the hollow portion 163 in a countercurrent direction to the flow of the cooling fluid 140 flowing through the conduits 161 to thermally contact and cool the oil 136 prior to re-introduction into the interior space 134. Further, either or both of the channels 152,154 can be manufactured with fins 162 in order to increase the thermal contact and consequent heat transfer between the oil 136 and cooling fluid 140 flowing through the channels 152,154.

In the exemplary illustrated embodiment of FIG. 11-12, in addition to the formation of the x-ray tube casing 100 to include the internal passages 138, instead of a conventional aluminum material, the casing 100 can be formed in an additive manufacturing process, such as a binder jet printing technique, among other suitable techniques, of at least one metal with high x-ray attenuation properties, such as, tungsten, tantalum, and molybdenum, among others, thereby eliminating the need for a separate x-ray attenuation layer within the casing 100. In another exemplary embodiment, the casing 100 and/or component parts thereof can be formed of a metal matrix material including at least one metal with high x-ray attenuation properties, such as, tungsten, tantalum, and molybdenum, among others, and at least one additional filler metal with a lower melting point than the x-ray attenuating metal and that can be infiltrated into the pores of the x-ray attenuating metal by capillary action. The filler metal is chosen to be compatible with the x-ray attenuating metal and to provide additional benefits to the casing 100, such as, increased thermal conductivity of the casing wall 121, improved tensile properties, increase ductility, and lower mass, among others. One exemplary embodiment of the metal matrix used to form the casing 100 is a matrix including tungsten as the x-ray attenuating metal with copper or a copper alloy filler metal. In exemplary embodiments the metals are combined to form the matrix a volume ratio of between 1:3 and approximately 3:1, with one exemplary embodiment having the volume ratio of the metals at approximately 1:1, though this can be varied depending on the size of the x-ray attenuating powder. When this metal matrix is employed to form the x-ray tube casing 100, the structure of the casing 100 including the x-ray attenuating metal removes the requirement for the lead lining/layer 130. This further reduces the overall weight of the x-ray tube casing 100 due to the removal of the lead layer 130.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An x-ray tube casing for an x-ray tube insert, the casing comprising:
   a central frame adapted to receive the x-ray tube insert therein, the central frame including a side wall and at least one passage formed internally within the side wall, the passage having an inlet end and an outlet end, wherein the at least one internal passage comprises:
  a first internal passage having an inlet and an outlet, wherein the first internal passage and is not in fluid communication with an interior space defined by the central frame; and
  a second internal passage having an inlet and an outlet, wherein the second internal passage is in fluid communication with the interior space defined by the central frame.

2. The x-ray tube casing of claim 1 wherein the at least one passage comprises at least two passages formed internally within the side wall.

3. The x-ray tube casing of claim 2 wherein the at least two passages are formed to be parallel, crosscurrent or countercurrent fluid flow passages.

4. The x-ray tube casing of claim 2 wherein one of the at least two passages is in fluid communication with an interior space of the central frame.

5. The x-ray tube casing of claim 1 wherein the at least one passage is operably connected to a cooling fluid reservoir.

6. The x-ray tube casing of claim 1 wherein the at least one passages include a number of fins formed therein.

7. The x-ray tube casing of claim 1 further comprising an x-ray attenuation layer disposed on an internal surface of the central frame.

8. The x-ray tube casing of claim 1 wherein the x-ray tube casing does not include a separate x-ray attenuation layer.

9. The x-ray tube casing of claim 1 further comprising a dielectric coolant pump operably connected to an interior space of the central frame.

10. The x-ray tube casing of claim 1 wherein the casing does not include a dielectric coolant pump operably connected to an interior space of the central frame.

11. The x-ray tube casing of claim 1 wherein the casing is formed of an x-ray attenuating metal.

12. The x-ray tube casing of claim 1 wherein the casing is formed of a metal matrix material including at least one x-ray attenuating metal and at least one additional metal.

13. The x-ray tube casing of claim 1 wherein the casing does not include a heat exchanger disposed on an exterior of the casing and operably connected to an interior space of the central frame.

14. An x-ray tube comprising:
  an x-ray tube insert including a frame defining an enclosure, a cathode assembly disposed in the enclosure an anode assembly disposed in the enclosure spaced from the cathode assembly, and a first x-ray transmissive window disposed on the frame; and
  an x-ray tube casing including a central frame within which the x-ray tube insert is placed, the central frame including a side wall, a second x-ray transmissive window on the side wall in alignment with the first x-ray transmissive window on the frame and at least one internal passage formed within the side wall, wherein the at least one internal passage comprises:
    a first internal passage having an inlet and an outlet, wherein the first internal passage and is not in fluid communication with an interior space defined by the central frame; and
    a second internal passage having an inlet and an outlet, wherein the second internal passage is in fluid communication with the interior space defined by the central frame.

15. The x-ray tube of claim 14 wherein the at least one internal passage includes an inlet and an outlet and is not in fluid communication with an interior space defined by the central frame.

16. The x-ray tube of claim 14 wherein the x-ray tube casing does not include an x-ray attenuation layer.

17. A method for cooling dielectric coolant within an x-ray tube, the method comprising the steps of:
  providing an x-ray tube casing including a central frame having at least one internal passage formed within the central frame;
  placing an x-ray tube insert within an interior space defined by the central frame;
  placing an amount of dielectric coolant in the interior space between the x-ray tube insert and the central frame; and
  directing a flow of cooling fluid through the at least one internal passage,
wherein the at least one internal passage includes a first internal passage within the central frame having an inlet and an outlet, wherein the first internal passage and is not in fluid communication with the interior space defined by the central frame and a second internal passage within the central frame having an inlet and an outlet, wherein the second internal passage and is in fluid communication with the interior space defined by the central frame, and wherein the step of directing flow of cooing fluid through the at least one internal passage comprises the steps of:
  directing the flow of cooling fluid through the first internal passage; and
  directing a flow of dielectric coolant through the second internal passage.

18. A method of manufacturing an x-ray tube casing for an x-ray tube insert, the casing including a central frame adapted to receive the x-ray tube insert therein, the central frame including a side wall and at least one passage formed internally within the side wall, the passage having an inlet end and an outlet end, wherein the method comprises the step of forming the central frame in an additive manufacturing process.

19. The method of claim 18 wherein the step of forming the central frame in an additive manufacturing process comprises:
  providing a metal matrix including at least one metal with high X-ray attenuation and at least one additional filler metal with a lower melting point than the at least one X-ray attenuating metal; and
  forming the central frame with the metal matrix in the additive manufacturing process.

20. The method of claim 19 wherein the at least one filler metal infiltrates the pores of the at least one X-ray attenuating metal by capillary action during the additive manufacturing process.

* * * * *